(12) United States Patent
Alamri et al.

(10) Patent No.: US 11,499,033 B2
(45) Date of Patent: Nov. 15, 2022

(54) FUNCTIONALIZED GRAPHENE AND EPOXY COMPOSITE

(71) Applicants: Saudi Arabian Oil Company, Dhahran (SA); Massachusetts Institute of Technology, Cambridge, MA (US)

(72) Inventors: Haleema A. Alamri, Thuwal (SA); Timothy Manning Swager, Cambridge, MA (US); Aziz Fihri, Paris (FR); Ihsan Altaie, Dharhan (SA); S. Sherry Zhu, Waban, MA (US)

(73) Assignees: Saudi Arabian Oil Company, Dhahran (SA); Massachusetts Institute of Technology, Cambridge, MA (US)

( * ) Notice: Subject to any disclaimer, the term of this patent is extended or adjusted under 35 U.S.C. 154(b) by 266 days.

(21) Appl. No.: 16/881,485

(22) Filed: May 22, 2020

(65) Prior Publication Data
US 2021/0363328 A1    Nov. 25, 2021

(51) Int. Cl.
| | |
|---|---|
| C08L 63/00 | (2006.01) |
| C08K 9/04 | (2006.01) |
| C08K 3/04 | (2006.01) |
| C01B 32/194 | (2017.01) |
| C01B 32/19 | (2017.01) |
| C08G 59/24 | (2006.01) |
| C08J 3/20 | (2006.01) |

(52) U.S. Cl.
CPC ................ *C08K 9/04* (2013.01); *C01B 32/19* (2017.08); *C01B 32/194* (2017.08); *C08G 59/245* (2013.01); *C08J 3/203* (2013.01); *C08K 3/042* (2017.05); *C01B 2204/04* (2013.01); *C01P 2004/24* (2013.01); *C08K 2201/002* (2013.01); *C08K 2201/011* (2013.01)

(58) Field of Classification Search
CPC .... C08K 9/04; C08K 3/042; C08K 2201/002; C08K 2201/011; C08G 59/245; C08J 3/203; C01P 2204/04; C01P 2004/24; C08L 63/00
USPC ....................................................... 523/205
See application file for complete search history.

(56) References Cited

U.S. PATENT DOCUMENTS

| | | | |
|---|---|---|---|
| 6,395,199 B1 | 5/2002 | Krassowski et al. | |
| 6,927,250 B2 | 8/2005 | Kaschak et al. | |
| 7,745,528 B2 | 6/2010 | Prud'Homme et al. | |
| 7,999,027 B2 | 8/2011 | Zhamu et al. | |
| 9,139,732 B2 | 9/2015 | Miltner et al. | |
| 9,758,379 B2 | 9/2017 | Blair | |
| 9,790,334 B2 | 10/2017 | Clauss et al. | |
| 10,036,239 B2 | 7/2018 | Salla et al. | |
| 10,113,056 B2 | 10/2018 | Choi et al. | |
| 2002/0109125 A1 | 8/2002 | Krassowski et al. | |
| 2014/0120399 A1* | 5/2014 | Balandin | H01M 10/659 252/74 |
| 2015/0125646 A1* | 5/2015 | Tournilhac | C09K 5/14 252/75 |
| 2019/0337806 A1* | 11/2019 | Hunter | C01B 32/198 |

FOREIGN PATENT DOCUMENTS

WO    2019090323 A1    5/2019

OTHER PUBLICATIONS

Artamkina et al., "Some Aspects of Anionico Complexes", Chem. Rev. vol. 82, pp. 427-459, 1982.
Chhetri et al., "Effect of Dodecyal Amine Functionalized Graphene on the Mechanical and Thermal Properties of Epoxy-Based Composites", Polymer Engineering and Science, vol. 56, pp. 1221-1228, 2016.
Choi et al., "Noncovalent functionalization of graphene with end-functional polymers", Journal of Materials Chemistry, vol. 20, pp. 1907-1912, 2010.
Embry et al., "Three-Dimensional Graphene Foam Induces Multifunctionality in Epoxy Nanocomposites by Simultaneous Improvement in Mechanical, Thermal, and Electrical Properties", ACS Appl. Mater. Interfaces, vol. 9, pp. 39717-39727, 2017.
Georgakilas et al., "Functionalization of Graphene: Covalent and Non-Covalent Approaches, Derivaties and Applications", Chemical Reviews, vol. 112, pp. 6156-6214, 2012.
Gu, et al., "Highly thermally conductive flame-retardant epoxy nanocomposites with reduced ignitability and excellent electrical conductivities", Composites Science and Technology, vol. 139, pp. 83-89, 2017.
Jeon et al., "Hyperstage Graphite: Electrochemical Synthesis and Spontaneous Reactive Exfoliation", Advanced Materials, vol. 30, 1704538 (7 pgs), 2018.
Jin et al., "Synthesis and application of epoxy resins: A review", Journal of Industrial and Engineering Chemistry, vol. 29, pp. 1-11, 2015.
Lahiri et al., "Graphene Nanoplatelet-Induced Strengthening of UltraHigh Molecular Weight Polyethylene and Biocompatibility In vitro", Applied Materials & Interfaces, vol. 4, pp. 2234-2241, 2012.
Lee et al., "Measurement of the Elastic Properties and Instrinsic Strength of Monolayer Graphene", Science, vol. 321, pp. 385-388, Jun. 12, 2008.
Lee et al., "Mechanical properties of nanocomposites with functionalized graphene", Journal of Composite Materials, vol. 59(27), pp. 3779-3789, 2016.
Liu et al., "Effect of graphene nanosheets on morphology, thermal stability and flame retardancy of epoxy resin", Composites Science and Technology, vol. 90, pp. 40-47, 2014.

(Continued)

*Primary Examiner* — Hannah J Pak
(74) *Attorney, Agent, or Firm* — Dinsmore & Shohl LLP

(57) ABSTRACT

A polymer composite formed from an epoxy based polymer and an amino-graphene. The epoxy based polymer forms a polymer matrix and the amino graphene is dispersed throughout the polymer matrix. Further, a graphene is functionalized with 3,5-dinitrophenyl groups to form functionalized graphene and one or more amine functional groups form Meisenheimer complexes with the functionalized graphene to form the amino-graphene. An associated method of making the polymer composite is also provided.

14 Claims, 6 Drawing Sheets

(56) References Cited

OTHER PUBLICATIONS

Ma et al., "High-Performance flame retarded paraffin/epoxy resin form-stable phase change material", J. Mater Sci., vol. 54, pp. 874-885, 2019.

Naebe et al., "Mechanical Property and Structure of Covalent Functionalised Graphene/Epoxy Nanocomposites", Scientific Reports, vol. 4 :4375, doi: 10.1038/srep04375, pp. 1-7, Mar. 14, 2014.

Ponnamma et al., "Graphene and graphitic derivative filled polmer composites as potential sensors", Royal Society of Chemistry, vol. 17, pp. 3954-3981, 2015.

Prolongo et al., "Influence of graphene nanoplatelets on curing and mechanical properties of graphene/epoxy Tanocomposites", J. Therm Anal Calorim, vol. 125, pp. 629-636, 2016.

Steurer et al., "Functionalized Graphenes and Thermoplastic Nanocomposites Based upon Expanded Graphite Oxide", Macromol. Rapid Commun., vol. 30, pp. 316-327, 2009.

Zhao et al., "High-performance and multifunctional epoxy composites filled with epoxide-functionalized graphene", European Polymer Journal, vol. 84, pp. 300-312, 2016.

International Search Report and Written Opinion dated Jul. 27, 2021 pertaining to International application No. PCT/US2021/032683 filed May 17, 2021, 16 pages.

Paraskar, P. et al. "Influence of amine functionalized graphene oxide on mechanical and thermal properties of epoxy matrix composites", Iranian Polymer Journal, Iran Polymer and Petrochemical Institute, IR, vol. 29, No. 1, Nov. 27, 2019, pp. 47-55.

Omidi-Ghallemohamadi, M. et al. "Epoxy networks possessing polyoxyethylene unites and loaded by Jeffamine-modified graphene oxide nanoplatelets" Progress in Organic Coatings, vol. 134, Sep. 1, 2019, pp. 264-271.

Ha, H. et al. "Polymer/graphene oxide (GO) thermoset composites with GO as a crosslinker" Korean Journal of Chemical Engineering, Springer New York LLC, US, KR, vol. 35, No. 2, Oct. 27, 2017, pp. 303-317.

Chatterjee, S. et al. "Mechanical reinforcement and thermal conductivity in expanded graphene nanoplatelets reinforced epoxy composites", Chemical Physics Letters, vol. 531, Feb. 11, 2012, pp. 6-10.

* cited by examiner

FUNCTIONALIZED GRAPHENE AND EPOXY COMPOSITE

BACKGROUND

Field

Embodiments of the present disclosure generally relate to functionalized graphene and epoxy composites and methods for making the same.

Technical Background

Epoxy-based thermosetting pipes are known for their valuable properties, such as chemical resistance, good mechanical and electrical insulating properties, and low shrinkage on cure, all of which make them effective candidates for use in industrial oil and gas applications. They are especially useful as an alternative to metallic pipe systems, in which the metallic surfaces are subject to internal and external corrosion. However, severe brittleness and poor resistance to crack propagation has restricted the applicability of epoxy-based materials for various fields. Fracture toughness is very crucial material property for structural applications. Thus, improvement in toughness and strength of epoxy resins without hampering its stiffness and thermal properties are obligatory if it is used in harsh situations such as under high load and elevated temperature and to foster its use in various applications.

Numerous approaches have been undertaken to augment toughness and fracture resistance usually by blending epoxy with second phase such as liquid rubber, thermoplastic particles, and inorganic particles.

Further, previous attempts have been made to form self-healing epoxy to retain toughness and fracture resistance of objects formed from the epoxy. Previous approaches at development of self-healing epoxy have focused on the use of microcapsules embedded and distributed in the epoxy bulk matrix. When the bulk epoxy matrix is damaged, the microcapsules rupture and release the healing agents in the form of epoxy monomer and hardener. Consequently, the material loses its ability to heal when the epoxy and hardeners capsules are depleted. Additionally, the incorporation of the microcapsules into epoxy matrix reduces their mechanical properties.

SUMMARY

There is a continual need for epoxy based composites which possess continual self-healing properties. Disclosed are functionalized graphene and epoxy composites and methods for making the same and specifically a composite of epoxy based polymer and amino-graphene which possess continual self-healing properties.

According to one embodiment, a polymer composite is provided. The polymer composite includes an epoxy based polymer forming a polymer matrix, and an amino-graphene dispersed throughout the polymer matrix. Further, a graphene is functionalized with 3,5-dinitrophenyl groups to form functionalized graphene and one or more amine functional groups form Meisenheimer complexes with the functionalized graphene to form the amino-graphene.

According to another embodiment, a method of forming a polymer composite is provided. The method of forming a polymer composite includes preparing a functionalized graphene and introducing one or more amines to the functionalized graphene to form Meisenheimer complexes between the functionalized graphene and the one or more amines to form an amino-graphene. The method further includes providing an epoxy based polymer and combining the amino-graphene and the epoxy based polymer to disperse the amino-graphene throughout a polymer matrix formed from the epoxy based polymer. The method also includes curing the epoxy based polymer to form the polymer composite. Preparing the functionalized graphene includes operating an electrochemically driven intercalation process on graphite to form graphene sheets, transferring the graphene sheets to a solution comprising a solution containing 3,5-dinitrobenzenediazonium tetrafluoroborate, and applying a negative potential ramp to the solution to functionalize the graphene sheets with functionalization with 3,5-dinitrophenyl groups and form the functionalized graphene.

Additional features and advantages of the embodiments described will be set forth in the detailed description which follows, and in part will be readily apparent to those skilled in the art from that description or recognized by practicing the embodiments described, including the detailed description which subsequently follows, and the claims.

DETAILED DESCRIPTION

Utilization of graphene in epoxy composites has allowed for the development of lightweight multifunctional composite materials with applications in many fields. Graphene has excellent mechanical, thermal, optical and electrical properties and this has made it a prime target for use as a filler material in the development of multifunctional polymeric composites. The present disclosure provides a mechanism to incorporate desirable properties of graphene into an epoxy matrix for the development of epoxy-based composites with smart capabilities such as self-healing, fire retardancy and sensing capabilities while exhibiting tremendous improvement in thermal and mechanical properties.

Figure 1:
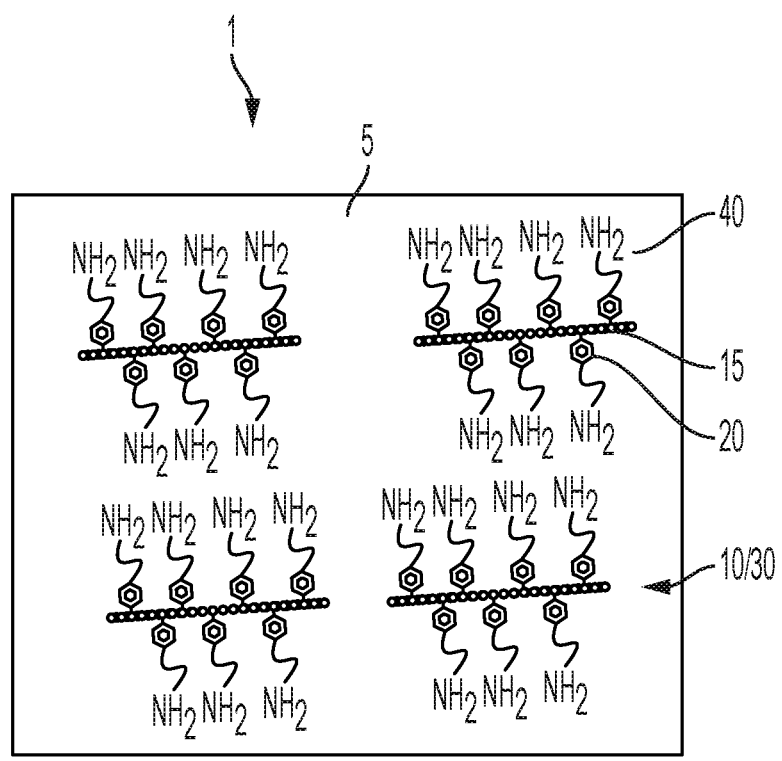
FIG. 1 is a schematic illustration of a polymer composite according to one or more embodiments of the present disclosure.

The present disclosure provides a polymer composite 1 formed from an epoxy based polymer 5 which forms a polymer matrix and an amino-graphene 10 dispersed throughout the polymer matrix. The amino-graphene 10 is formed when graphene 15 is functionalized with 3,5-dinitrophenyl groups 20 to form functionalized graphene 30 and then one or more amine functional groups 40 form Meisenheimer complexes with the functionalized graphene 30. Such arrangement is illustrated in FIG. 1 where it will be appreciated that the amino-graphene 10 is shown not to scale to allow for identification of the subcomponents.

Graphene agglomeration is a persistent problem in previous graphene and epoxy based polymer composite as graphene agglomeration imposes stress concentrations at the interface with the polymer matrix. The stress concentrations may result in failure of the formed composite. Thus, it is important to achieve maximal dispersion and desirable interfacial properties between the graphene filler and the polymeric matrix. To accomplish this, the new functional forms of amino-graphene 10 disclosed in the present disclosure have been developed to affix amine functional groups 40 to graphene 15 and improve dispersion through the polymeric matrix.

In one or more embodiments, graphene 15 is functionalized with 3,5-dinitrophenyl groups 20 to form functionalized graphene 30. The 3,5-dinitrophenyl groups 20 may be affixed to the substrate of graphene 15 in accordance with techniques discussed in Jeon, B. Yoon, M. He, T. M. Swager, *Advanced Materials* 2018, 30, the contents of which are incorporated in their entirety.

Figure 2:
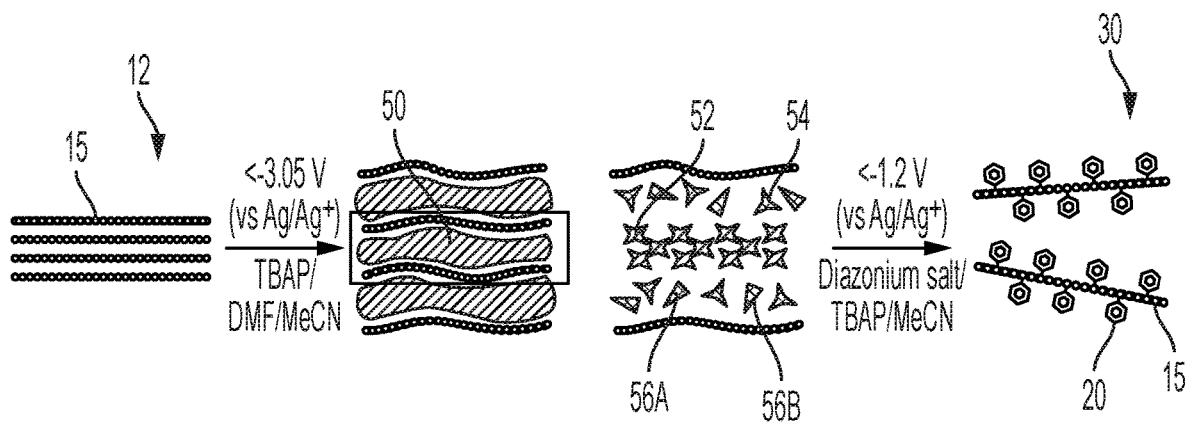
FIG. 2 is an illustration of a functionalization process to form functionalized graphene according to one or more embodiments of the present disclosure.

In one or more embodiments, 3,5-dinitrophenyl groups 20 may be affixed to a substrate of graphene 15 formed from graphite or graphene oxide. For simplicity, throughout the present disclosure reference will be made to highly oriented pyrolytic graphite (HOPG) 12. Specifically, an electrochemically driven intercalation process followed by functionalization as depicted in FIG. 2 may be utilized. With the goal of creating extended functionalized graphene 30 with minimal defects in the hexagonal graphene lattice to allow functionalization with 3,5-dinitrophenyl groups 20, HOPG 12 may be utilized as a high-purity graphite source. In contrast to randomly oriented graphite, HOPG conserves the monolithic structure and electrical connectivity of the graphite domains throughout the necessary expansion that accompanies the electrochemical generation of the different graphite intercalation compounds (GICs) 50. In accordance with the electrochemically driven intercalation process, intercalation of tetrabutylammonium (TBA+) 52 as the GIC 50 is inserted into the space between layers of the graphite 12 to form individual graphene 15 layers. The high reducing potentials of HOPG 12 results in tetrabutylammonium (TBA+) 52 intercalation between the graphene sheets 15. It has been found that the solvent has an effect on the process with a mixture of acetonitrile (MeCN) and dimethylformamide (DMF) providing desirable results. A continuous electrochemical potential ramp maintains a driving force for full intercalation of TBA+ 52, which is accompanied by a dramatic volumetric expansion of HOPG 12.

It will be appreciated that the introduction of the GICs 50 weakens the attractive potential between graphene layers 15; however, the material is still relatively inert as a result of the ordered intercalation ions. With increasing voltage, the graphene/TBA+ matrix exhibits an increasing interlayer spacing (d001 spacing) between the sheets of graphene 15. For example, the spacing may increase from 3.35 Å to 8.17 Å to 12.70 Å to 15.30 Å and finally to a disordered arrangement with increasing voltage. It is believed there is a resultant reductive fragmentation of TBA+ 52 ions via decompostion into tributylamine 54, butane 56A, and alkanes 56B with increasing voltage. The structurally disorganized graphene 15 may then be transferred as an activated electrode to a solution containing 0.1 M 3,5-dinitrobenzenediazonium tetrafluoroborate (3,5-DiNBD) and 1 M tetrabutylammonium perchlorate (TBAP) in MeCN. Application of a negative potential ramp from −1.2 to −2.0 V results in a reductive functionalization with 3,5-dinitrophenyl 3,5 dinitriphenyl groups 20. The graphite undergoes spontaneous exfoliation to give MeCN solutions of soluble functionalized graphene 30 having functionalization with 3,5-dinitrophenyl groups 20.

Figure 3:
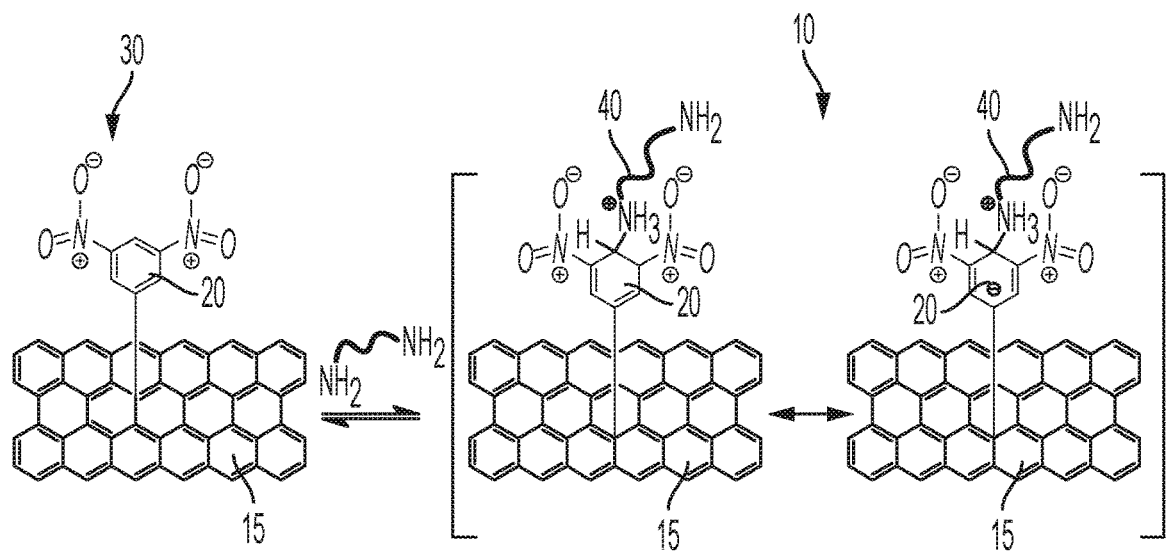
FIG. 3 is an illustration of generation of a Meisenheimer complex between functionalized graphene and one or more amine functional groups according to one or more embodiments of the present disclosure.

In one or more embodiments, the amino-graphene 10 is generated by forming Meisenheimer complexes between the functionalized graphene 30 and the one or more amine functional groups 40. It will be appreciated that a Meisenheimer complex, alternately known as a Jackson-Meisenheimer complex, is a 1:1 reaction adduct between an arene carrying electron withdrawing groups and a nucleophile. Generation of the Meisenheimer complexes between the functionalized graphene 30 and the one or more amine functional groups 40 is illustrated in FIG. 3.

In one or more embodiments, the one or more amine functional groups 40 are primary amines. In various further embodiments, one or more amine functional groups 40 are selected from one or more of aliphatic amines, cycloaliphatic amines, aromatic amines, hydrazines, hydrazides, functionalized amines such as fluorinated aliphatic and aromatic amines and polyamines, silanized amines, and their polyamines and derivatives.

In one or more embodiments, the graphene 15 comprises an average platelet thickness of less than 10 atomic layers. For purposes of this disclosure, an atomic layer of graphene represents a sheet of graphene formed from a single layer of carbon atoms. In various further embodiments, the graphene 15 comprises an average platelet thickness of less than 8 atomic layers, less than 5 atomic layers, or less than 3 atomic layers.

In one or more embodiments, an average thickness of approximately 4.3 nanometers (nm) was observed for the functionalized graphene 30. The thickness corresponds to two-side functionalized single-layer graphene structures and double-layer graphene structures. Measurement was obtained using an atomic force microscope (AFM) profile.

In one or more embodiments, at least 5% of the graphene 15 is single atomic layer graphene. In various further embodiments, at least 10% of the graphene 15 is single atomic layer graphene, at least 15% of the graphene 15 is single atomic layer graphene, or at least 20% of the graphene 15 is single atomic layer graphene.

In one or more embodiments, at least 90% of the graphene 15 in the functionalized graphene 30 is single atomic layer graphene. In various further embodiments, at least 95% of the graphene 15 in the functionalized graphene 30 is single atomic layer graphene, at least 99% of the graphene 15 in the functionalized graphene 30 is single atomic layer graphene, or at least 99.5% of the graphene 15 in the functionalized graphene 30 is single atomic layer graphene.

In one or more embodiments, epoxy based polymer 5 is a polymer comprising one or more epoxide groups in accordance with structure 1 provided supra. The epoxy based polymer 5 may be formed from a Bisphenol-based epoxy resin. For example, reacting epichlorohydrin (ECH) with bisphenol A forms a bisepoxide. In further embodiments, the ECH may react with bisphenol F to form a different bisepoxide.

Structure 1

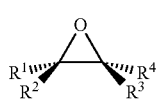

One having skill in the art will be familiar with the process and mechanism of epoxy resin curing. For purposes of this disclosure, the epoxy resin utilized for the formation of the epoxy-based polymer 15 may be selected from any epoxy resin which undergoes the same crosslinking mechanism as the bisphenol A based epoxy resin. An example structure of an epoxy resin formed from bisphenol A is provided as Structure 2.

Structure 2

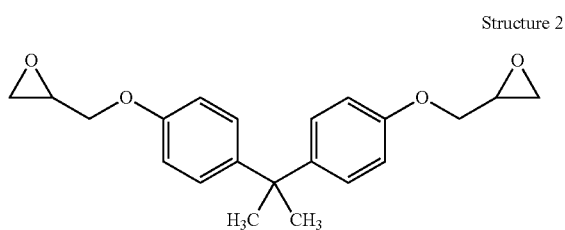 [SMILES: CC(C)(c1ccc(OCC2CO2)cc1)c1ccc(OCC2CO2)cc1]

In one or more embodiments, the amino-graphene 10 as discussed in the present disclosure may be utilize as a curing agent for the epoxy-based polymer 5. Specifically, the amine functional groups 40 attached to the functionalized graphene 30 may be utilized as a hardener for the epoxy resin. It is known to those skilled in the art that amines form an important class of epoxy hardeners. As such, it will be appreciated that the amine functional groups 40 presented in the amino-graphene 10 may not only assist with achieving increased dispersion of the graphene 15 throughout the polymer matrix of the epoxy-based polymer 5, but also be utilized as a curing agent or hardener for the epoxy-based polymer 5 itself.

The amino-graphene 1 obtained through the dynamic covalent chemistry of the Meisenheimer complex demonstrates improved dispersibility compared to prior attempts at incorporation of graphene in a polymer matrix. In one or more embodiments, the amino-graphene 10 is homogenously integrated throughout a bulk polymer matrix of the epoxy-based polymer 5. It will be appreciated that polymer matrix comprises the bulk polymer matrix and interface regions, the interface regions representing domains at interfaces that are rich in the epoxy-based polymer 5 or the amino-graphene 10. There may be less than a 10% variance in the concentration of the amino-graphene 10 from a region of highest concentration to a region of lowest concentration within the bulk polymer matrix. In further embodiments, there is less than an 8% variance, less than a 5% variance, or less than a 3% variance in the concentration of the amino-graphene 10 from a region of highest concentration to a region of lowest concentration within the bulk polymer matrix. The homogenous nature of the integration may be quantified using the glass transition temperature (To, as increased $T_g$ is indicative of more homogenous covalent interactions. The improved dispersibility of the graphene 15 and interfacial interactions contributes to the improvement in strength, stiffness, and mechanical properties of the formed polymer composite 1. Additionally, the dynamic nature of the covalent chemistry also provides repair or healing centers due to its dynamic nature of reconnecting with a reversible bond with primary amines.

In various embodiments, the amino-graphene 10 is provided in the polymer matrix of the epoxy-based polymer 5 at 0.1 wt. %, 0.2 wt. %, 0.1 to 0.2 wt. %, 0.1 to 0.5 wt. %, 0.1 to 1.0 wt. %, 0.1 to 1.5 wt. %, or 0.1 to 2 wt. % of the total polymer composite 1.

Further, in one or more embodiments, the amino-graphene 10 acts as a co-cross-linker of the polymer matrix of the epoxy-based polymer 5. The amino-graphene 10 can be utilized as the main cross-linker for the epoxy-based polymer 5. The amino-graphene 10 can also be utilized in combination with another cross linker when the amino-graphene 10 used doesn't have sufficient reactivity to fully cure the epoxy-based polymer 5 based on the structure of the amine.

The polymer composite 1 formed in accordance with the present disclosure may have desirable properties including flame retardancy properties, self-healing properties, and sensing properties. These desirable properties will be discussed more fully subsequently.

In one or more embodiments, the polymer composite 1 formed in accordance with the present disclosure may have flame retardancy properties as a result of the uniform distribution of the amino-graphene 10. Specifically, graphene 15 holds a great potential performing as a flame retardant additive generally in composite structures. Graphene 15 has the capability to change the pyrolysis mechanism as well as the viscosity of polymers, heat absorption and thermal conductivity, which can improve the polymer thermal stability and delay or inhibit fire ignition or spreading. Uniformly dispersed nanocomposites, such as graphene 15, have rheological properties comparable to those of true solids. Therefore, the dispersion of the graphene 15 determines the quality of the surface layer formed during combustion and thus affects the flame retardancy of the resulting polymer composite 1. The functionalized graphene 30 with attachment of one or more amine functional groups 40 through the dynamic covalent chemistry enhances the uniformity of the dispersed graphene 15 into the polymer matrix of the epoxy-based polymer 5. As uniform dispersion of the graphene 15 affects the robustness of the flame retardancy, it will be appreciated that the improved dispersion of the graphene 15 results in improved flame retardancy properties of the formed polymer composite 1.

Graphene 15 exhibits high flame retarding efficiency and low loading as well as good environmental acceptance. It is believed that graphene 15 and its derivatives can change the pyrolysis as well as the thermal conductivity, heat absorption, viscosity and dripping of polymers. This property of graphene 15 means it may be utilized to improve the thermal stability of polymers and delay their ignition. Graphene 15 may also inhibit fire from spreading and reduce heat release rate dependent on how dispersed the graphene 15 is in the polymer matrix. When compared to conventional graphene/epoxy composites, the polymer composite 1 of the present disclosure provides a powerful tool to have the flame retardant entity distributed across the polymer matrix allowing the functionalized graphene 30 to function as a mass transport barrier, slowing the escape of the volatile product across the polymer matrix as measured using the Limiting Oxygen Index (LOI).

In accordance with one or more embodiments, the polymer composite 1 formed from an amino-graphene 10 dispersed throughout the polymer matrix of an epoxy based polymer 5 may possess self-healing properties. Previous attempts at self-healing properties in epoxy-based composites have been based on triggering with an external stimulus, the use of encapsulated healants that can release materials upon damage, and through the use of macromolecular systems composed of polymers crosslinked using dynamic bonding. The present disclosure provides a mechanism of using functionalized graphene 30 through dynamic covalent chemistry which allows for enhancement of the uniformity of the dispersed graphene 15 into the polymer matrix of the epoxy-based polymer 5. The enhanced uniformity of the dispersed graphene 15 in the epoxy-based polymer 5 facilitates the self-healing properties of the resulting composite material 1.

It is well known, that delamination occurs in composites materials due to the weak bonding between materials within the composite resulting in an internal failure of the material. The dynamic covalent nature of Meisenheimer complex as utilized with the amino-graphene 10 of the present disclosure, allows the amino-graphene 10 to act as a binder whenever there is a bond breaking that might damage the structure. Specifically, the Meisenheimer complex allows for reattachment of the one or more amine functional groups 40 to the functionalized graphene 30 and the resulting restoration of the polymer composite 1 integrity.

Figure 4:
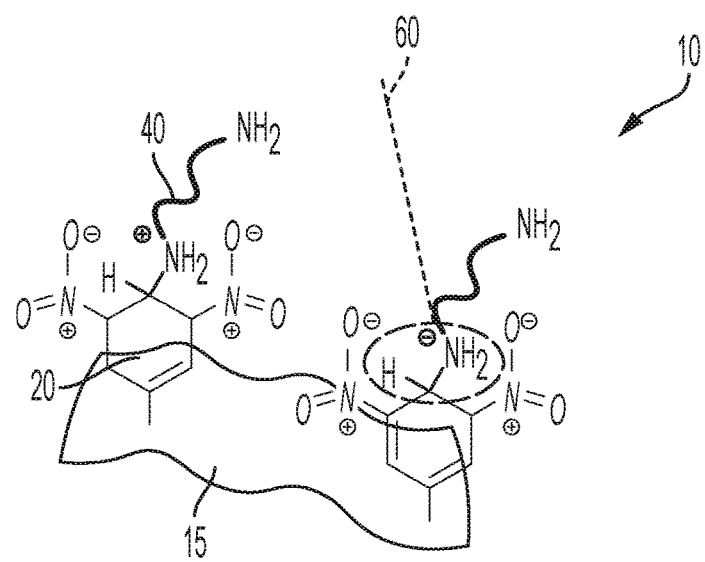
FIG. 4 is an illustration of an amino-graphene according to one or more embodiments of the present disclosure.

With reference to FIG. 4, the dissociation of the amine functional group 40 from the 3,5-dinitrophenyl groups 20 of the functionalized graphene 30 is illustrated at a self-healing center 60 at the point of attachment. Specifically, the one or more amine functional groups 40 may dissociate under high load applied to the composite polymer 1 part which causes predictable bond disruptions. However, as a result of the reversibility of the reaction and the Meisenheimer complex, the amine functional groups 40 may re-attach to the functionalized graphene 30 once there has been local relaxation in the material of the composite polymer 1. It will be appreciated that due to its dynamically-bonded nature the healing capabilities of the polymer composites 1 should never be exhausted and can function multiple times to provide repeatable, autonomous recovery of mechanical and electrical properties of the polymer composite 1 material. In fact, the polymer composite 1 material is effectively returned to the exact same state as prior to application of the applied load with reattachment of the amine functional groups 40 to the functionalized graphene 30.

It will be appreciated that in one or more embodiments, that reattachment of the one or more amine functional groups 40 to the functionalized graphene 30 and the resulting restoration of the polymer composite 1 integrity after relation of an applied strain is in the same orientation as prior to application of the applied strain. Specifically, since the polymer composite 1 is already crosslinked at the time of introduction of the applied strain, localized movement of the polymer composite 1 is restricted and prevents slippage of the internal network. Once the strain is removed, the one or more amine functional groups 40 are already in position to reattach to the functionalized graphene 30 in the same orientation as prior to application of the strain.

In various embodiments, external stimuli may be applied to expedite the healing aspects of the polymer composite 1 material. Specifically, heat, light, microwave radiation, or combinations of the same may be directed to the polymer composite 1 material to expedite the reattachment of the amine functional groups 40 to the functionalized graphene 30. It will be appreciated that the functional amine attached to the graphene 15 may incorporate some moieties that are capable of absorbing microwave or infrared light and thus can quickly spread heat across the polymer matrix of the polymer composite 1 and increase the energy conversion efficiencies to promote self-healing of the polymer composite 1 through the dynamic covalent bonding stimulated by the temperature increase.

In one or more embodiments, the dynamic covalent chemistry of the Meisenheimer complex of the functionalized graphene 30 and amine functional groups 40 may be utilized as a hardener to introduce sensing capabilities to the polymer composite 1. Specifically, the functionalized graphene 30 network within the polymer matrix of the epoxy-based polymer 5 can change its internal connectivity upon environmental changes. For example, temperature changes, strain, and humidity changes result in changes of the electrical resistance of the polymer composite 1 and thus establish sensing capabilities in the polymer composite 1. The change in electrical resistance of the polymer composite 1 upon environmental changes allows for determination of the environmental changes by monitoring the electrical resistance of the polymer composite 1. One skilled in the art would further appreciate that changes in each of temperature, strain, and humidity also result in changes to the electrical resistance of a composite comprising graphene. The mechanisms of such changes are known to those skilled in the art.

Figure 5:
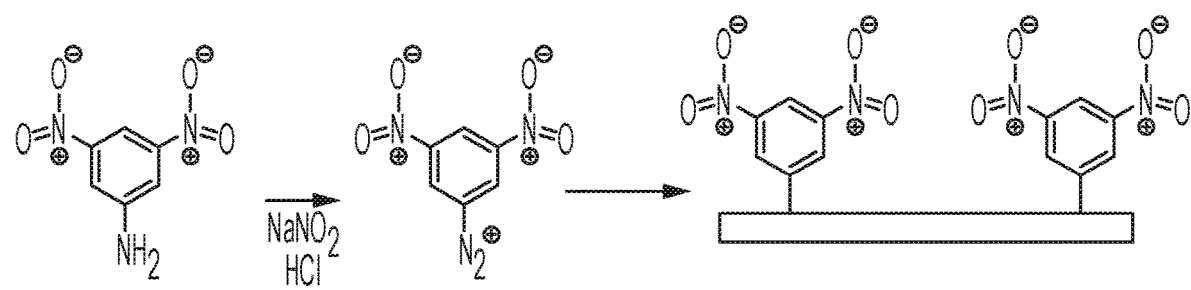
FIG. 5 is an illustration of functionalization of an additive according to one or more embodiments of the present disclosure.

The functionalization of graphene 15 with 3,5-dinitrophenyl groups 20 may be extended to further fillers within the polymer matrix of the epoxy-based polymer 5. By expanding the functionalization with 3,5-dinitrophenyl groups 20 to a broader class of fillers beyond graphene 15, it is possible to minimize the load of graphene 15 within the polymer composite 1. Minimizing the load of graphene 15 within the polymer composite 1 is desirable because of the high cost associated with graphene 15 and the limited loading capacity of the polymer matrix of the epoxy-based polymer 5. The 3,5-dinitrophenyl groups 20 may be affixed to other fillers by utilizing 3,5-dinitroaniline as a precursor which is transformed into various diazonium species that can functionalize a wide range of potential filler materials. Additional non-limiting example fillers include inorganic compounds such as $SiO_2$, $Al_2O_3$, $ZrO_2$, $TiO_2$ as well as carbonaceous compounds such as graphene oxides and carbon nanotubes. The generalized formation scheme is illustrated in FIG. 5. Once attached, the dazonium species can form Meisenheimer complexes with any free $NH_2$ in the surrounding environment to augment the benefits provided by the functionalized graphene 15.

Figure 6:
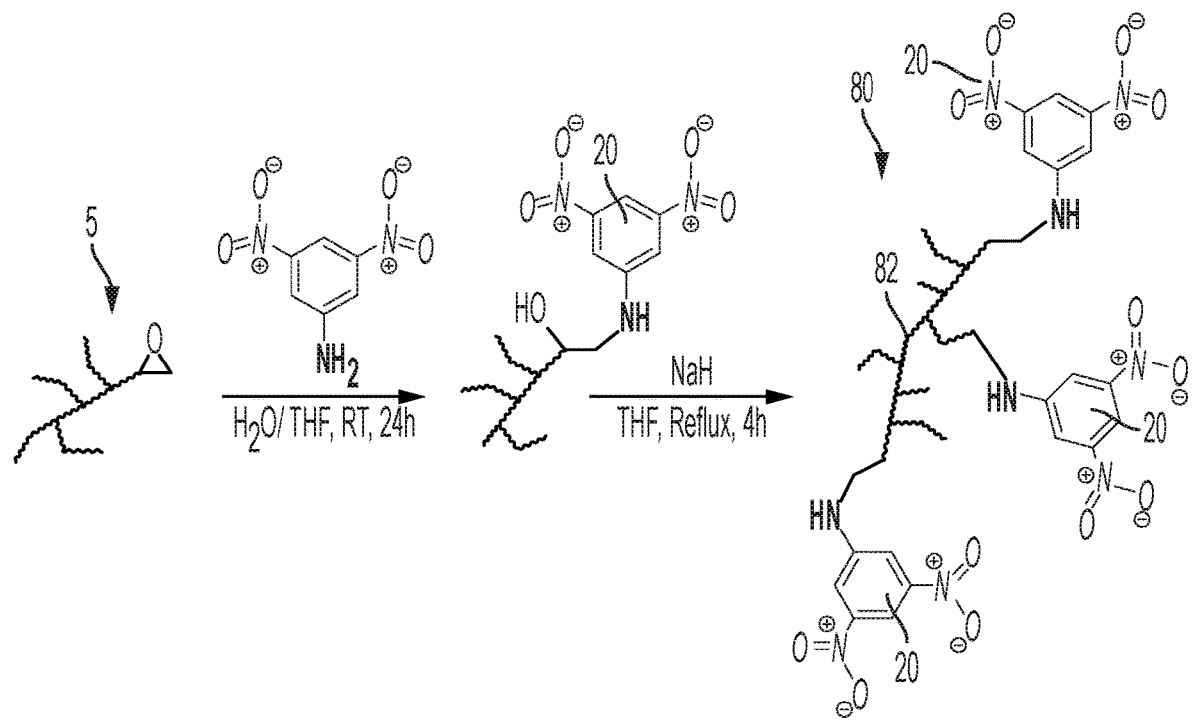
FIG. 6 is an illustration of synthesis of a reinforcing polymer according to one or more embodiments of the present disclosure.
Figure 7:
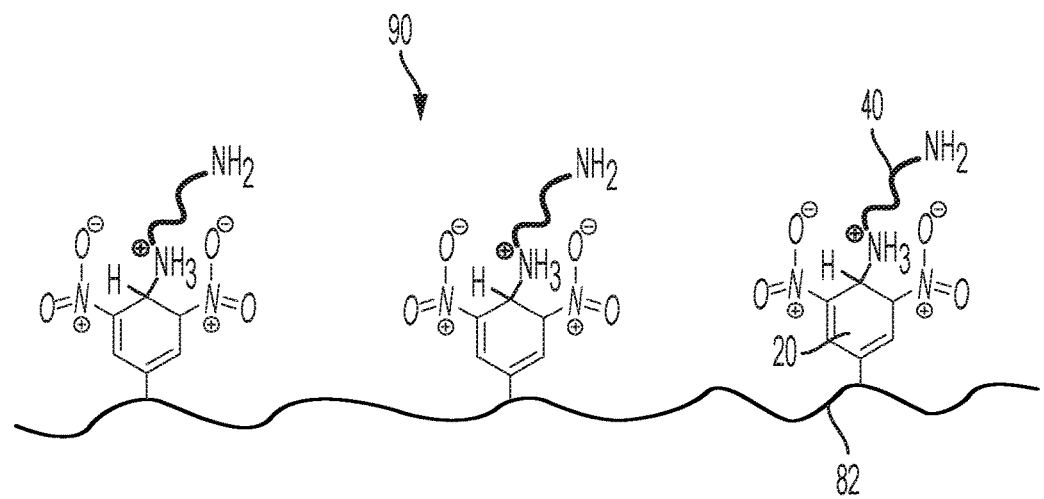
FIG. 7 is an illustration of a functionalized reinforcing polymer according to one or more embodiments of the present disclosure.

The functionalization with 3,5-dinitrophenyl groups 20 may also be extended to synthesis of a reinforcing polymer 80 that has the 3,5-dinitrophenyl functionality 20 grafted all along the polymer backbone 82. Synthesis of such a reinforcing polymer 80 is illustrated in FIG. 6 with an epoxy based polymer 5 and the resulting functionalized reinforcing polymer 90 is illustrated in FIG. 7. Once attached, the 3,5-dinitrophenyl groups 20 can form Meisenheimer complexes with any free $NH_2$ in the surrounding environment to augment the benefits provided by the functionalized graphene 15. The functionalized reinforcing polymer 90 may be embedded into the polymer matrix of the epoxy based polymer 5 to augment the self-healing properties of the polymer composite 1 by adding additional Meisenheimer complexes throughout the structure of the polymer composite 1. Leveraging the reinforcing polymer 80 with attached 3,5-dinitrophenyl groups 20 to form the functionalized reinforcing polymer 90 enhances the composite polymer 1 structure without requiring increase in the graphene 15 loading beyond an acceptable level. Non-limiting examples of polymer backbones where functionalization with 3,5- dinitrophenyl groups may be extended include epoxies, acrylics, and other functional polymers.

Test samples were prepared to experimentally demonstrate the effect of inclusion of the amino-graphene 10 in the polymer matrix of the epoxy based polymer 1.

Comparative Sample 1 was prepared as neat epoxy with an amine added. Specifically, Comparative Sample 1 did NOT include graphene or the amino-graphene 10 in accordance with the present disclosure. The epoxy resin utilized was Bisphenol A diglycidyl ether (DGEBA). The amine mixed with the DGEBA epoxy resin was 4,4'-Methylenedianiline, Isophoronediamine, at a ratio of DGEBA/Amine of 4:1. The DGEBA epoxy resin was then subsequently cured to form a solid test sample.

Inventive Sample 2 was prepared with the inclusion of an amino-graphene 10 mixed into the epoxy resin in accordance with the present disclosure. Inventive Sample 2 included 0.1 wt. % of an amino-graphene 10 prepared according to the present disclosure distributed in a DGEBA epoxy resin. The amino-graphene 10 of Inventive Sample 2 comprised 0.1 wt. % of functionalized amine groups 40. The DGEBA epoxy resin was then subsequently cured to form a solid test sample.

Inventive Sample 3 was prepared with the inclusion of an amino-graphene 10 mixed into the epoxy resin in accordance with the present disclosure. Inventive Sample 3 includes increased amino-graphene 10 content as compared to Inventive Sample 2. Specifically, Inventive Sample 3 included 0.2 wt. % of an amino-graphene 10 prepared according to the present disclosure distributed in a DGEBA epoxy resin. The amino-graphene of Inventive Sample 3 comprised 0.2 wt % of functionalized amine groups 40. The DGEBA epoxy resin was then subsequently cured to form a solid test sample.

A comparison of the compositions of each of Comparative Sample 1, Inventive Sample 2, and Inventive Sample 3 are provided in Table 1. It will be appreciated that graphene alone would be ineffective to crosslink the polymer and thus can't be used without amine.

TABLE 1

Sample Compositions

| Sample | DGEBA/Amine molar ratio epoxy resin | Graphene (wt. % of Polymer Composite) |
|---|---|---|
| Comparative Sample 1 | 4:1 | none |
| Inventive Sample 2 | 4:1 | 0.1 |
| Inventive Sample 3 | 4:1 | 0.2 |

Figure 8:
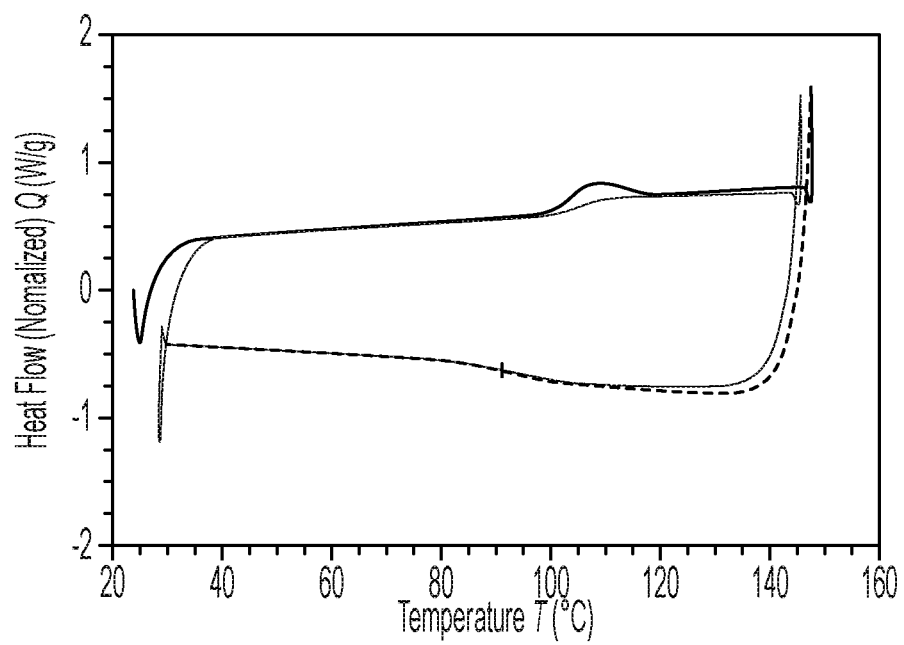
FIG. 8 is a graph of TGA results of Comparative Example 1.
Figure 9:
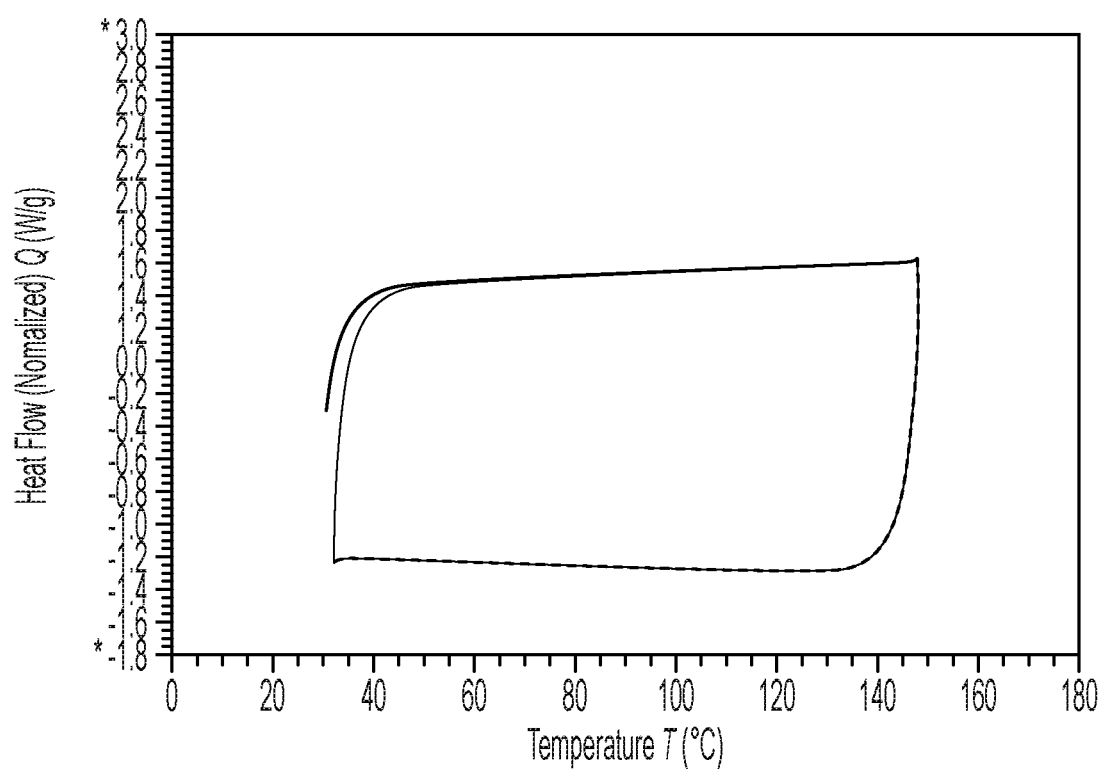
FIG. 9 is a graph of TGA results of Inventive Example 2.
Figure 10:
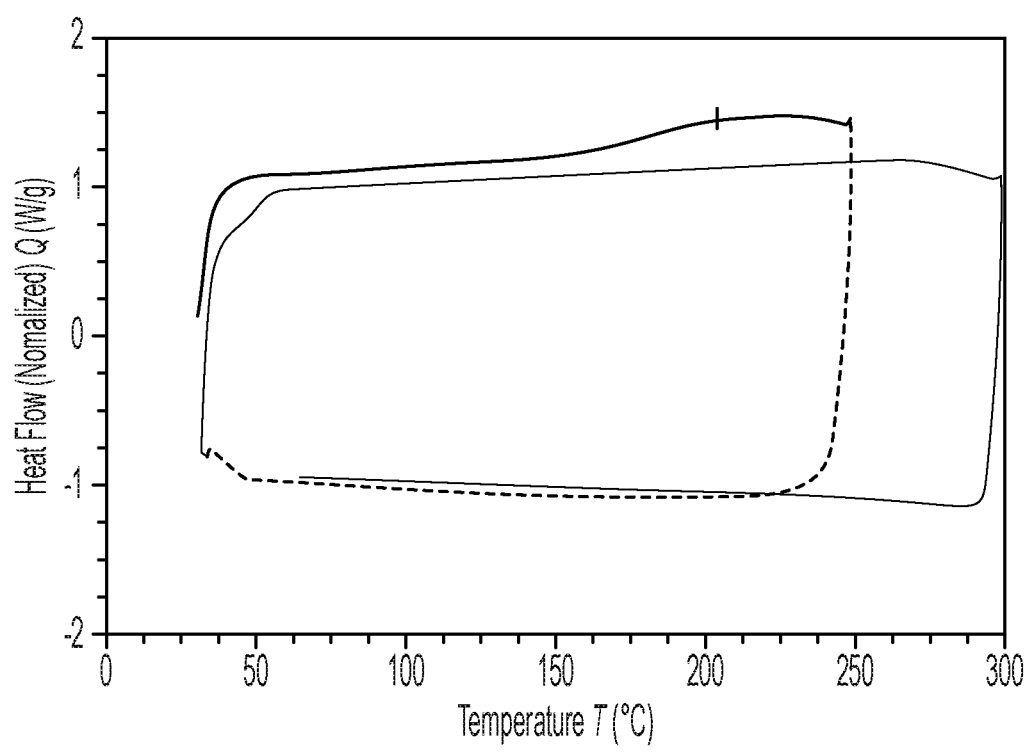
FIG. 10 is a graph of TGA results of Inventive Example 3.

Each of Comparative Sample 1, Inventive Sample 2, and Inventive Sample 3 were tested by Thermogravimetric analysis (TGA) to demonstrate the change in properties with the addition of the amino-graphene in accordance with the present disclosure. With reference to FIG. 8, it is shown in a graph of TGA results that Comparative Sample 1 demonstrates a glass transition temperature ($T_g$) of approximately 100° C. With reference to FIG. 9, it is shown that in a graph of TGA results addition of amino-graphene 10 as a crosslinking agent in Inventive Sample 2 yields an increase in the $T_g$ to greater than 150° C. Similarly, with reference to FIG. 10, it is shown in a graph of TGA results that further increase in the content of graphene 15 and amine functional groups 40, as with Inventive Sample 3, yields a yet greater increase in the $T_g$ to approximately 180° C. It is noted that each of FIGS. 8, 9, and 10 include data for each sample type run two times to improve accuracy of the $T_g$ measurement.

It will be appreciated that the change in $T_g$ translates to improvements in the properties of the crosslinked epoxies as $T_g$ is a macroscopic indication of the relaxation behavior of nanocomposite systems. The magnitude of $T_g$ depends on multiple structural parameters. For graphene-based composites, the $T_g$ of epoxy was reportedly increased by 50 C with the addition of only 1 wt % functionalized graphene, a phenomenon attributed to a strong particle-polymer interaction. The increased $T_g$ of the polymer composites of the present disclosure is thus attributed to the strong confinement effect of graphene sheets on the epoxy crosslinked chains, and involves covalent bonding. Neat epoxy resin shows a $T_g$ of 120° C. With the addition of 1 wt % functionalized graphene, $T_g$ increases to 200. The rise in $T_g$ upon inclusion of graphene is often associated with a restriction in molecular motion and higher degree of crosslinking indicating significant changes in polymer chains dynamics.

It should be understood that the various aspects of the polymer composite and methods of using the same are described and such aspects may be utilized in conjunction with various other aspects.

In a first aspect, the disclosure provides a polymer composite. The polymer composite comprises an epoxy based polymer forming a polymer matrix, and an amino-graphene dispersed throughout the polymer matrix. Further, the graphene is functionalized with 3,5-dinitrophenyl groups to form functionalized graphene and one or more amine functional groups form Meisenheimer complexes with the functionalized graphene to form the amino-graphene.

In a second aspect, the disclosure provides the polymer composite of the first aspect, in which the one or more amine functional groups are primary amines.

In a third aspect, the disclosure provides the polymer composite of the first or second aspects, in which the one or more amine functional groups are selected from one or more of aliphatic amines, cycloaliphatic amines, aromatic amines, hydrazines, hydrazides, functionalized amines, silanized amines, and their polyamines and derivatives.

In a fourth aspect, the disclosure provides the polymer composite of any of the first through third aspects, in which the polymer matrix comprises a bulk polymer matrix and interface regions, the interface regions representing domains at interfaces that are rich in the epoxy or the graphene.

In a fifth aspect, the disclosure provides the polymer composite of the fourth aspect, in which the amino-graphene is homogenously integrated throughout the bulk polymer matrix with less than a 10% variance in the concentration of the amino-graphene from a region of highest concentration to a region of lowest concentration within the bulk polymer matrix.

In a sixth aspect, the disclosure provides the polymer composite of any of the first through fifth aspects, in which the amino-graphene is provided in the polymer matrix at 0.1 to 2 wt. % of the polymer composite, or 0.1 to 1.5 wt. % of the polymer composite, or 0.1 to 1.0 wt. % of the polymer composite, or 0.1 to 0.5 wt. % of the polymer composite.

In a seventh aspect, the disclosure provides the polymer composite of any of the first through sixth aspects, in which the amino-graphene is provided in the polymer matrix at 0.1 to 2 wt. % of the polymer composite.

In an eighth aspect, the disclosure provides the polymer composite of any of the first through seventh aspects, in which the graphene has an average platelet thickness of less than 5 atomic layers, or less than 3 atomic layers.

In a ninth aspect, the disclosure provides the polymer composite of any of the first through eighth aspects, in which at least 95% of the graphene in the functionalized grapheme is single atomic layer graphene, or at least 99% of the graphene in the functionalized graphene is single atomic layer graphene, or at least 99.5% of the graphene in the functionalized graphene is single atomic layer graphene.

In a tenth aspect, the disclosure provides the polymer composite of any of the first through ninth aspects, in which the polymer composite further comprises fillers functionalized with 3,5-dinitrophenyl groups in addition to the functionalized graphene.

In an eleventh aspect, the disclosure provides the polymer composite of the tenth aspect, in which the fillers are selected from one or more of $SiO_2$, $Al_2O_3$, $ZrO_2$, $TiO_2$, graphene oxides, and carbon nanotubes.

In a twelfth aspect, the disclosure provides the polymer composite of any of the first through eleventh aspects, in which the amino-graphene acts as a co-cross-linker of the polymer matrix.

In a thirteenth aspect, the disclosure provides the polymer composite of any of the first through twelfth aspects, in which the epoxy based polymer is formed from a bisphenol A based epoxy resin.

In a fourteenth aspect, the disclosure provides the polymer composite of any of the first through thirteenth aspects, in which the polymer matrix is functionalized with 3,5-dinitrophenyl groups along a polymer backbone of the epoxy based polymer.

In a fifteenth aspect, the disclosure provides the polymer composite of any of the first through fourteenth aspects, in which the polymer composite demonstrates self-healing capabilities after relaxation of an applied strain.

In a sixteenth aspect, the disclosure provides the polymer composite of any of the first through fifteenth aspects, in which the graphene is formed from graphite.

In a seventeenth aspect, the disclosure provides the polymer composite of the sixteenth aspect, in which the graphite is highly oriented pyrolytic graphite.

In an eighteenth aspect, the disclosure provides the polymer composite of any of the first through fifteenth aspects, in which the graphene is formed from graphene oxide.

In a nineteenth aspect, the disclosure provides a method of forming a polymer composite. The method comprises preparing a functionalized graphene by: operating an electrochemically driven intercalation process on graphite to form graphene sheets, transferring the graphene sheets to a solution comprising a solution containing 3,5-dinitrobenzenediazonium tetrafluoroborate, and applying a negative potential ramp to the solution to functionalize the graphene sheets with functionalization with 3,5-dinitrophenyl groups and form the functionalized graphene. The method further comprises introducing one or more amines to the functionalized graphene to form Meisenheimer complexes between the functionalized graphene and the one or more amines to form an amino-graphene; providing an epoxy based polymer; combining the amino-graphene and the epoxy based polymer to disperse the amino-graphene throughout a polymer matrix formed from the epoxy based polymer; and curing the epoxy based polymer.

In a twentieth aspect, the disclosure provides the method of the nineteenth aspect, in which the one or more amines are primary amines.

In a twentieth aspect, the disclosure provides the method of the nineteenth aspect, in which the one or more amine are primary amines.

In a twenty-first aspect, the disclosure provides the method of the nineteenth or twentieth aspects, in which the one or more amines are selected from one or more of aliphatic amines, cycloaliphatic amines, aromatic amines, hydrazines, hydrazides, functionalized amines, silanized amines, and their polyamines and derivatives.

In a twenty-second aspect, the disclosure provides the method of any of the nineteenth through twenty-first aspects, in which the polymer matrix comprises a bulk polymer matrix and interface regions, the interface regions representing domains at interfaces that are rich in the epoxy or the graphene.

In a twenty-third aspect, the disclosure provides the polymer composite of the twenty-second aspect, in which the amino-graphene is homogenously integrated throughout the bulk polymer matrix with less than a 10% variance in the concentration of the amino-graphene from a region of highest concentration to a region of lowest concentration within the bulk polymer matrix.

In a twenty-fourth aspect, the disclosure provides the method of any of the nineteenth through twenty-third aspects, in which the amino-graphene is provided in the polymer matrix at 0.1 to 2 wt. % of the polymer composite, or 0.1 to 1.5 wt. % of the polymer composite, or 0.1 to 1.0 wt. % of the polymer composite, or 0.1 to 0.5 wt. % of the polymer composite.

In a twenty-fifth aspect, the disclosure provides the method of any of the nineteenth through twenty-fourth aspects, in which the epoxy based polymer is formed from a bisphenol A based epoxy resin.

In a twenty-sixth aspect, the disclosure provides the method of any of the nineteenth through twenty-fifth aspects, in which the graphene sheets have an average platelet thickness of less than 5 atomic layers, or less than 3 atomic layers.

In a twenty-seventh aspect, the disclosure provides the method of any of the nineteenth through twenty-sixth aspects, in which at least 95% of the graphene in the functionalized graphene is single atomic layer graphene, or at least 99% of the graphene in the functionalized graphene is single atomic layer graphene, or at least 99.5% of the graphene in the functionalized graphene is single atomic layer graphene.

In a twenty-eighth aspect, the disclosure provides the method of any of the nineteenth through twenty-seventh aspects, in which the graphite is highly oriented pyrolytic graphite.

It should be apparent to those skilled in the art that various modifications and variations can be made to the embodiments described throughout the present disclosure without departing from the spirit and scope of the claimed subject matter. Thus it is intended that the specification cover the modifications and variations of the various embodiments described throughout the present disclosure, provided such modifications and variations come within the scope of the appended claims and their equivalents.

The various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value to about another particular value and are inclusive unless otherwise indicated. When such a range is expressed, it is to be understood that another embodiment is from the one particular value to the other particular value, along with all combinations within said range.

As used herein and in the appended claims, the words "comprise," "has," and "include" and all grammatical variations thereof are each intended to have an open, non-limiting meaning that does not exclude additional elements or steps.

What is claimed is:

1. A polymer composite comprising
an epoxy based polymer forming a polymer matrix, and
an amino-graphene dispersed throughout the polymer matrix,
wherein a graphene is functionalized with 3,5-dinitrophenyl groups to form functionalized graphene and one or more amine functional groups form Meisenheimer complexes with the functionalized graphene to form the amino-graphene, and the graphene in the functionalized graphene has an average platelet thickness of less than 10 atomic layers.

2. The polymer composite of claim 1, wherein the one or more amine functional groups are primary amines.

3. The polymer composite of claim 1, wherein the one or more amine functional groups are selected from one or more of aliphatic amines, cycloaliphatic amines, aromatic amines, hydrazines, hydrazides, functionalized amines, silanized amines, and their polyamines and derivatives.

4. The polymer composite of claim 1, wherein the polymer matrix comprises a bulk polymer matrix and interface regions, the interface regions representing domains at interfaces that are rich in the epoxy based polymer or the amino-graphene, and
wherein the amino-graphene is homogenously integrated throughout the bulk polymer matrix with less than a 10% variance in the concentration of the amino-graphene from a region of highest concentration to a region of lowest concentration within the bulk polymer matrix.

5. The polymer composite of claim 1, wherein the amino-graphene is provided in the polymer matrix at 0.1 to 2 wt. % of the polymer composite.

6. The polymer composite of claim 1, wherein the graphene in the functionalized graphene has an average platelet thickness of less than 5 atomic layers.

7. The polymer composite of claim 1, wherein at least 95% of the graphene in the functionalized graphene is single atomic layer graphene.

8. The polymer composite of claim 1, wherein the polymer composite further comprises one or more fillers functionalized with 3,5-dinitrophenyl groups in addition to the functionalized graphene.

9. The polymer composite of claim 8, wherein the fillers are selected from one or more of $SiO_2$, $Al_2O_3$, $ZrO_2$, $TiO_2$, graphene oxides, and carbon nanotubes.

10. The polymer composite of claim 1, wherein the amino-graphene acts as a co-cross-linker of the polymer matrix.

11. The polymer composite of claim 1, wherein the epoxy based polymer is formed from a bisphenol A based epoxy resin.

12. The polymer composite of claim 1, wherein the polymer matrix is functionalized with 3,5-dinitrophenyl groups along a polymer backbone of the epoxy based polymer.

13. The polymer composite of claim 1, wherein the polymer composite demonstrates self-healing capabilities after relaxation of an applied strain.

14. The polymer composite of claim 1, wherein the graphene in the functionalized graphene is formed from highly oriented pyrolytic graphite.

* * * * *